Aug. 26, 1930.  F. A. HANSON ET AL  1,774,001
PRESSURE REGULATOR FOR PUMPS
Filed Dec. 23, 1926    2 Sheets-Sheet 1
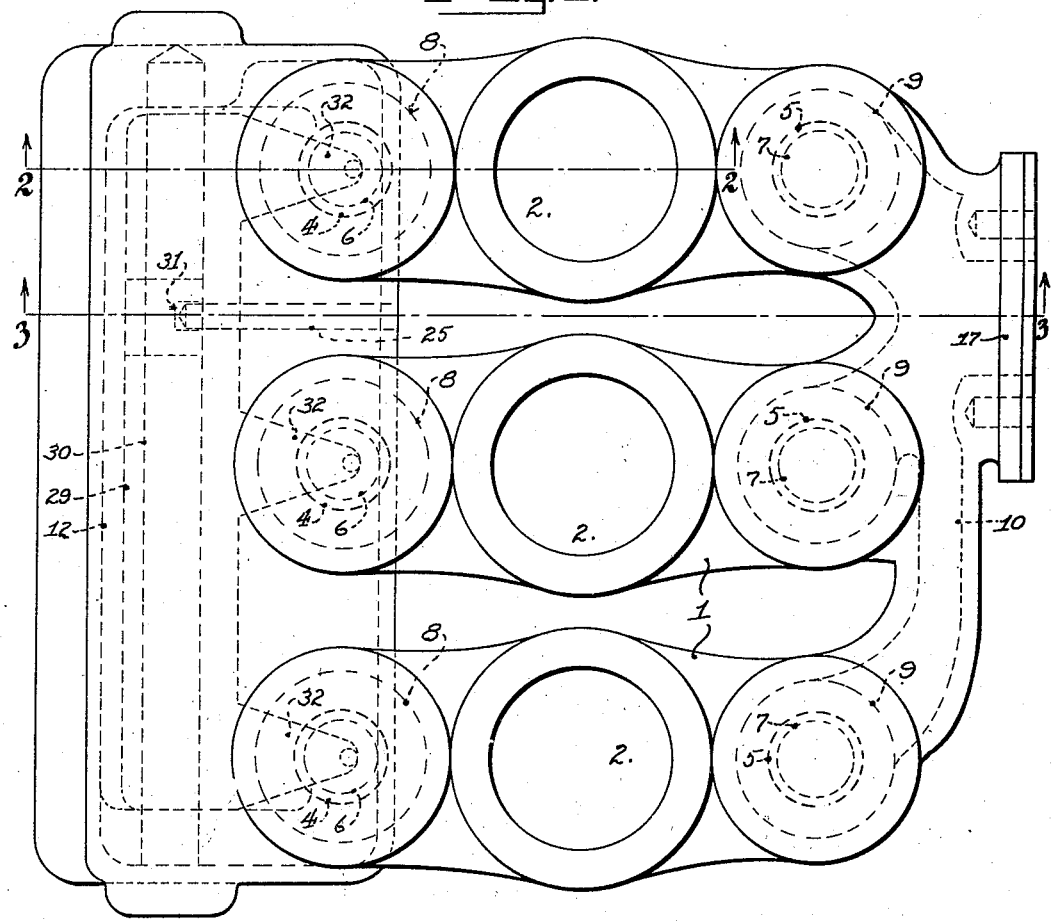
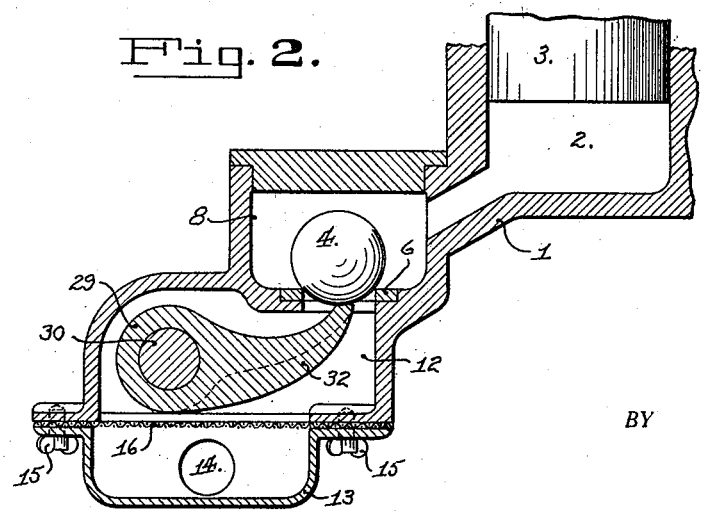
INVENTORS
Floyd A. Hanson,
Frank H. Lewis,
BY  Booth & Booth
ATTORNEYS.

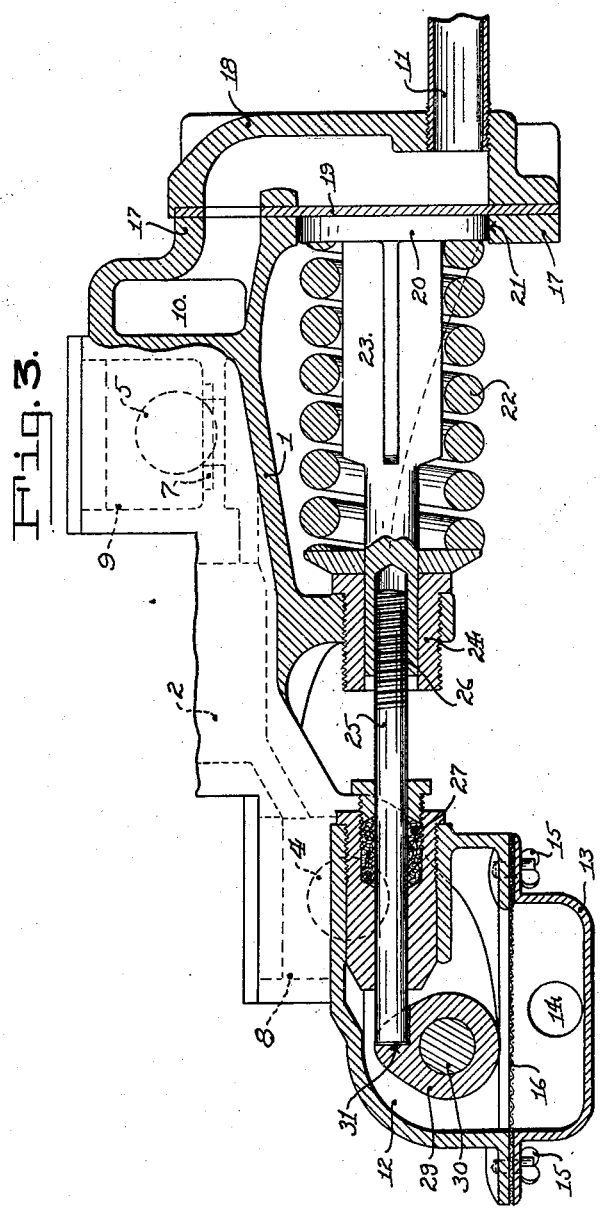

Patented Aug. 26, 1930

1,774,001

UNITED STATES PATENT OFFICE

FLOYD A. HANSON AND FRANK H. LEWIS, OF SAN JOSE, CALIFORNIA, ASSIGNORS, BY MESNE ASSIGNMENTS, TO FOOD MACHINERY CORPORATION, OF SAN JOSE, CALIFORNIA, A CORPORATION OF DELAWARE

PRESSURE REGULATOR FOR PUMPS

Application filed December 23, 1926. Serial No. 156,622.

Our invention relates to pressure regulators especially adapted for use in connection with continuously operating pumps having a plurality of cylinders.

The principal object of our invention is to provide a pressure regulator which makes use of the usual inlet and discharge valves of the pump cylinders to control the fluid pressure at the discharge and to relieve the pump of its load when such discharge pressure rises to a predetermined maximum. Our invention permits the use of extremely simple mechanism, regardless of the number of cylinders of the pump, and it requires no extra valves, the usual cylinder discharge valves acting to retain the fluid pressure in the discharge conduit system, and the usual inlet valves being used as unloader valves in a manner to be described hereinafter.

Another object of the invention is to provide a convenient means for draining the cylinders and intake passages of liquid supply pumps, to prevent freezing in cold weather. A further object is to provide means for automatically flushing and cleaning the strainer in the pump intake. Still other objects and advantages will be apparent from the following description of a typical form of pump embodying the invention.

Our invention is of especial value in connection with pumps adapted to supply fluids under high pressure, and particularly liquids of a corrosive nature such as those sometimes employed in insecticide spraying, painting, etc. The valves of such pumps are notoriously difficult to keep in good condition, the great pressure and velocity of the liquid, even when not chemically corrosive, acting to wear and cut the faces of the valves and their seats.

The elimination of extra valves in such apparatus not only reduces the first cost, but also materially reduces the cost of maintenance and the time necessary for replacements. Moreover, by utilizing the individual valves of the several cylinders instead of providing one valve or a set of valves common to all cylinders for the regulating functions, our invention divides the work and the wear consequent thereto among all the valves, so that the wear upon any one valve is comparatively slight.

We do not wish to be understood as restricting our invention to pumps used for the purpose mentioned above by way of example, for it may also be used to advantage in connection with any multi-cylinder pump. It is also to be understood that the form, construction and arrangement of the several parts of the apparatus herein described and illustrated may be varied, within the limits of the claims hereto appended, without departing from the spirit of the invention as set forth in said claims.

With this in view, our invention will now be described fully with reference to the accompanying drawings, wherein:—

Fig. 1 is a plan view of the base member of a three-cylinder pump, portions of our pressure regulator being shown in dotted lines.

Fig. 2 is a section on the line 2—2 of Fig. 1.

Fig. 3 is a section on the line 3—3 of Fig. 1.

In the drawings, the reference numeral 1 designates the base member of a pump having a plurality of cylinders 2, three such cylinders being shown in Fig. 1. Each cylinder is understood to have a suitable piston, one of which is shown at 3 in Fig. 2. The pistons may be assumed to be operated in the usual manner by connecting rods and a crank shaft, not shown, the cranks of which are 120 degrees apart.

Each cylinder 2 has an inlet valve 4 and a discharge valve 5. These valves are shown as ball checks, having the respective seats 6 and 7 and operating in chambers or cages 8 and 9. Such construction is well known in the art. A discharge conduit or manifold 10 is provided, preferably common to all cylinders, and from said manifold a pipe 11, Fig. 3, may lead to any desired point for conducting the fluid discharged by the pump. The intakes of the several cylinders are similarly connected with a conduit or manifold 12, running the entire length of the base 1. The bottom of said intake manifold is formed as a separable pan 13, Figs. 2 and 3, into which the fluid enters at 14 from the source of supply, not shown. The pan 13 is preferably secured to the upper portion of the manifold 12 by bolts or studs provided with wing nuts 15, and a flat screen 16 is clamped between said pan and the manifold. Such a screen has a large area to reduce clogging, and is easily accessible for cleaning or replacement by the removal of the pan 13. It is also automatically cleaned by the back flow of the fluid when the inlet valves are opened by the regulating or unloading mechanism, as will be described hereinafter.

The discharge manifold 10 terminates in a flange 17, Fig. 3, to which is secured, by any suitable means, not shown, a chambered cap 18, the discharge pipe 11 leading from said cap as shown. A flexible diaphragm 19 is clamped between said cap and the flange 17, and is exposed to the pressure of the fluid within the discharge manifold 10 and pipe 11. A plunger 20, slidable in a guide way 21 formed in the lower part of the flange 17, bears against the outer face of the diaphragm, and is backed by a spring 22. The plunger 20 has a stem 23 operating in a guide 24 secured to the base 1. A rod 25 is adjustably secured, as by a threaded connection 26, to said stem, and extends through suitable packing 27 and a guide bushing 28 into the intake manifold 12.

An oscillatable member 29 is mounted upon a shaft 30 within the intake manifold 12, and extends the entire length thereof. At one point in its length, said member is provided with a shoulder 31, Fig. 3, against which the end of the diaphragm plunger rod 25 bears. The member 29 has a plurality of laterally extending curved arms 32, Figs. 1 and 2, one such arm being positioned with its end beneath each inlet valve 4. Therefore, when the plunger rod 25 is moved toward the left, by the action of the diaphragm 19, the member 29 is rocked, and its arms 32 lift all the inlet valves off their seats.

The operation of our pressure regulator will be apparent. When the parts are in the positions shown in the drawings, the pump functions normally, drawing in the fluid from the intake manifold 12 through the valves 4, and expelling it through the valves 5 into the discharge manifold 10 and pipe 11, which are parts of the discharge conduit system. When the pressure in said discharge manifold and pipe rises to the desired maximum, the diaphragm 19 forces the plunger 20, stem 23 and rod 25 to the left against the compression of the spring 22, thereby rocking the member 29 and causing its arms 32 to lift and, so long as the pressure continues, hold the inlet valves 4 off their seats. This relieves the pump of its load and causes it to cease pumping into the discharge system, but the discharge valves 5 retain the fluid pressure in the discharge manifold 10 and pipe 11. Then when the pressure drops, the spring 22 returns the plunger 20 to its normal position, and the member 29 is rocked back, by the weight of its arms 32, thereby allowing the inlet valves to seat and operate normally.

It is to be noted that the leverage of the valve lifting arms 32 is such that only a very slight movement of the diaphragm 19 is sufficient to produce considerable lift of the valves. This is of advantage in reducing quickly the pressure and velocity of the fluid passing through the lifted valves, thereby reducing wear upon said valves and their seats. Another factor which contributes to the long life of the valves and seats is the dividing up of the unloading function among a number of valves. The amount of high-pressure fluid which passes through any one valve at the instant of opening is much less than would be the case if a single valve were used to unload all cylinders, and the pressure and velocity of such fluid is reduced correspondingly quicker. The discharge valves are also relieved of considerable use and wear, because during the time in which the inlet valves are held open, no fluid is being pumped through said discharge valves, which remain seated.

Moreover, not all the cylinders are working against pressure at any given time. In a three cylinder pump, for example, at least one and sometimes two cylinders are working on the suction stroke at the instant of unloading, so that only the valve of the remaining cylinder is opened against high pressure. Since all the inlet valves are opened by the rocker member 29, only one, or at the most two of said valves are subjected to the passage of fluid at high pressure and velocity at any one unloading operation.

In three cylinder pumps, in which either one or two inlet valves may be subjected to high pressure at any given instant of time, it is desirable to make the rocker member 29 in such a manner as to cause it to open the valves successively, rather than exactly simultaneously. By this means the discharge pressure, acting upon the diaphragm 19, must, at each unloading operation, overcome the cylinder pressure upon only one inlet valve at a time, instead of sometimes two, as would be the case if the rocker member 29 opened all the inlet valves at exactly the same instant, and consequently the pressure in the discharge system can be maintained between close limits, a result that could not be accomplished if said discharge pressure were required to open sometimes only one inlet valve against full cylinder pressure, and at other times two inlet valves exactly simultaneously.

The intervals between the successive openings of the valves need be only very slight, because once the valve is opened, the cylinder pressure is immediately relieved. Sufficient interval can be secured, in practise, by grinding off the ends of the arms 32 to slightly different lengths, or by any other equivalent means.

In two or four cylinder pumps, in which the same number of inlet valves are always subjected to full cylinder pressure, the opening of the inlet valves can be exactly simultaneous, instead of successive, as described above. In either case, the essential point is not that the inlet valves are opened simultaneously or successively, but that a plurality of such valves are opened by a common means responsive to the discharge pressure.

Our device has a further advantage in providing a means for quickly and easily draining the pump cylinders and valve chambers in the case of liquid pumps. Such draining, which is necessary to prevent freezing in cold weather, is accomplished merely by shutting off the discharge system at the nozzle or other delivery apparatus, not shown, and allowing the pressure to build up to the unloading point before stopping the pump. The inlet valves 4 are thus held open after the pump stops, and the liquid drains from the cylinders and inlet valve chambers back through the manifold 12 into the supply tank or to any other suitably provided outlet, not shown. Such draining of the cylinders is rendered possible, of course, not only by the holding open of the inlet valves by the pressure actuated devices, but also by the relative positions of the cylinder, inlet valves, discharge valves, and inlet manifold 12, said inlet valves being at a lower level and the discharge valves at a higher level than the cylinders, and said manifold opening upwardly into said valves, so that all can be readily drained, preferably through one outlet. This draining operation requires much less labor and time than the usual practise of opening the inlet valve cages and lifting the valves by hand. The liquid in the discharge valve cages and discharge system can be drained out in the usual way through the pipe 11.

A still further advantage of our invention resides in the automatic flushing or cleaning of the screen 16 referred to above. Whenever the inlet valves are opened by the described pressure controlled mechanism, the fluid is alternately drawn into and forced out of the cylinders through the inlet valves and the screen, and this back flow of fluid through said screen effectually washes off any sediment adhering to its under side. As the unloading operation normally occurs at frequent intervals, the screen is kept clean, the sediment settling into the pan 13 from which it may be removed easily when necessary.

We claim:—

1. The combination with a pump having a plurality of cylinders each provided with an inlet valve and a discharge valve, of inlet and discharge conduits common to a plurality of said cylinders, said inlet conduit being formed as an elongated chamber; a removable bottom cover for said chamber; a screen extending across said chamber above said bottom cover; means for conducting fluid into said chamber below said screen; a member mounted in said chamber above said screen and having means adapted to open the inlet valves; and means responsive to the pressure of the fluid in said discharge conduit for operating said member.

2. The combination with a pump having a plurality of cylinders each provided with an inlet valve and a discharge valve, of inlet and discharge conduits common to said cylinders and positioned on opposite sides thereof; an oscillatable member mounted within the inlet conduit and having arms adapted to engage and open the inlet valves; movable means mounted in the discharge conduit and responsive to the pressure therein; a rod extending between said conduits and connecting said oscillatable member and said pressure responsive means for movement in one direction; and a spring for moving said rod in the other direction.

In testimony whereof we have signed our names to this specification.

FLOYD A. HANSON.
FRANK H. LEWIS.